Figure 1:
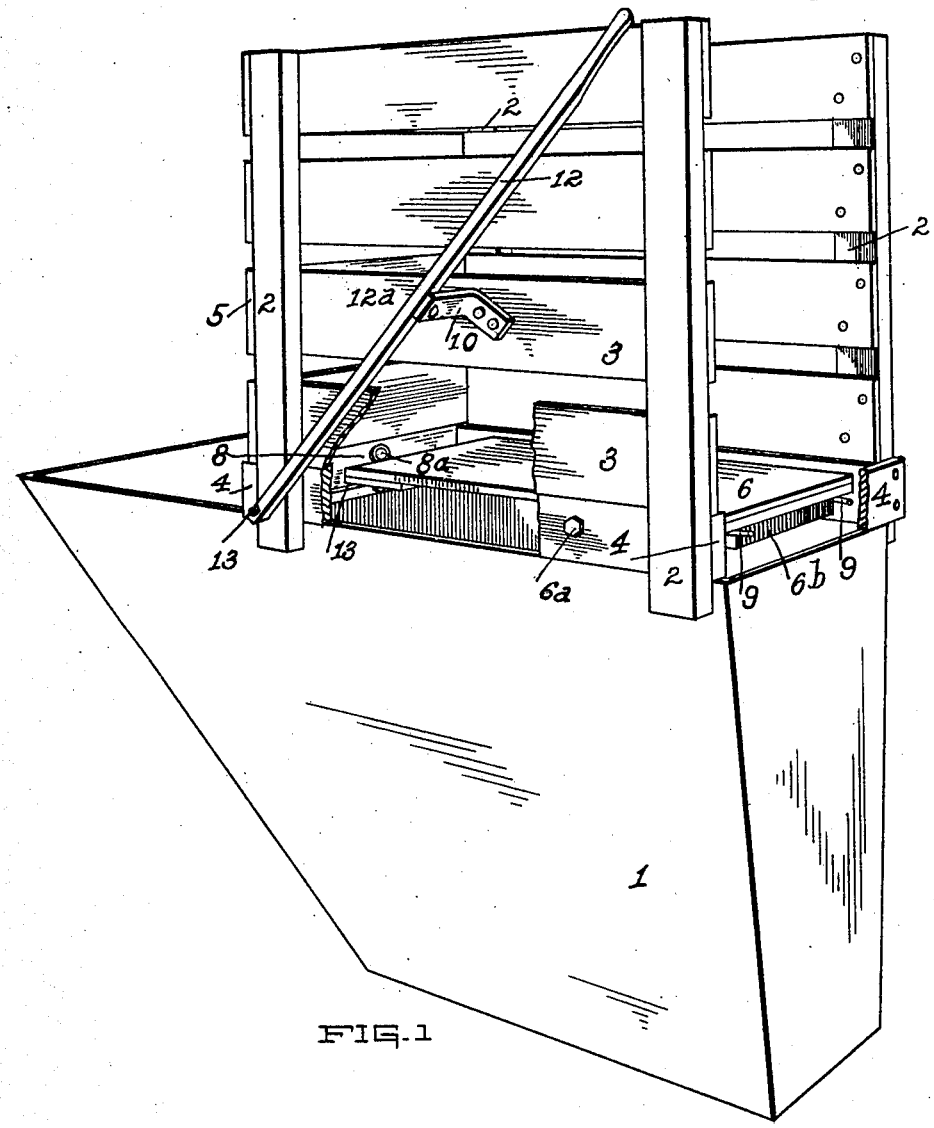

No. 892,081. PATENTED JUNE 30, 1908.
J. P. & R. L. PLUMMER.
ANIMAL DUMP.
APPLICATION FILED AUG. 21, 1907.

2 SHEETS—SHEET 1.

Witnesses
O. A. Merkel.
V. E. Georg.

Inventors
JAMES P. PLUMMER and
ROY L. PLUMMER
By Atty. N. DuBois.

No. 892,081. PATENTED JUNE 30, 1908.
J. P. & R. L. PLUMMER.
ANIMAL DUMP.
APPLICATION FILED AUG. 21, 1907.
2 SHEETS—SHEET 2.
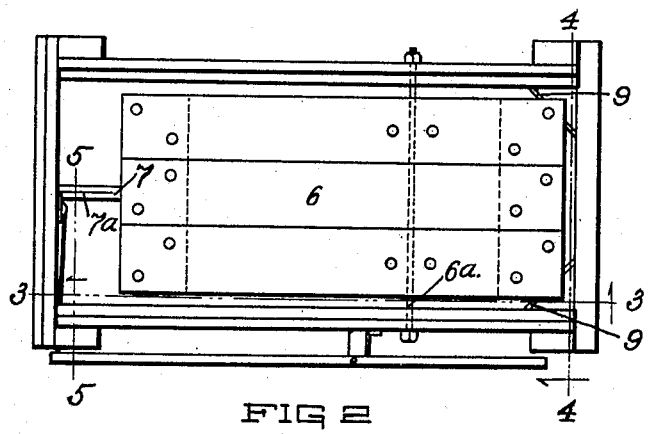
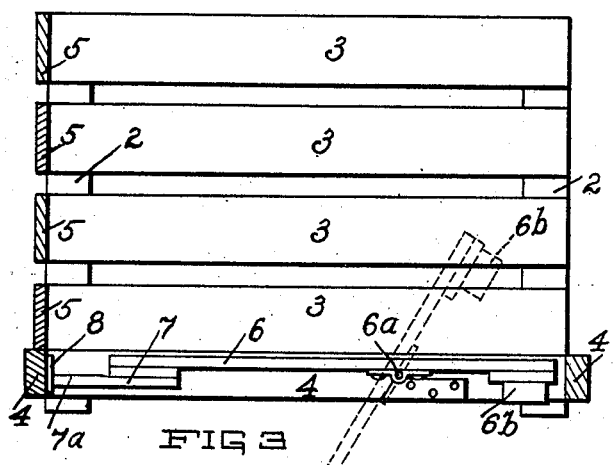
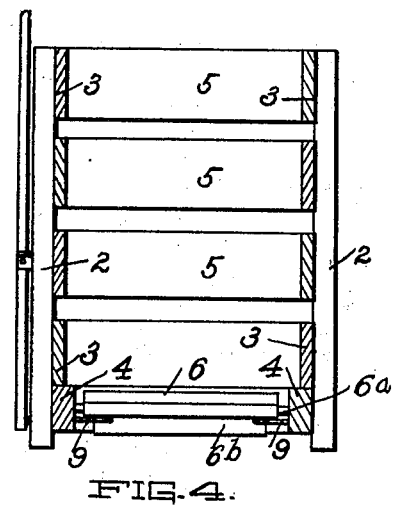
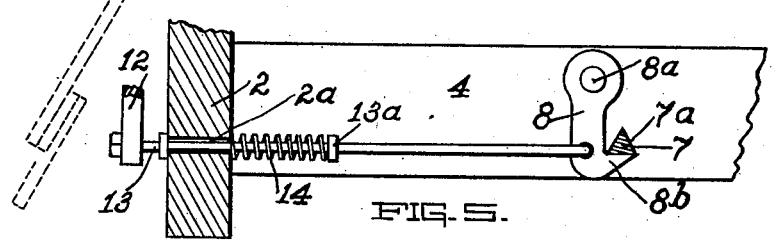
Witnesses
O. A. Merkel.
V. E. Georg.
Inventors
JAMES P. PLUMMER and
ROY L. PLUMMER
By Atty. N. DuBois.

UNITED STATES PATENT OFFICE.

JAMES P. PLUMMER AND ROY L. PLUMMER, OF ROCHESTER, ILLINOIS.

ANIMAL-DUMP.

No. 892,081.　　　Specification of Letters Patent.　　Patented June 30, 1908.

Application filed August 21, 1907. Serial No. 389,593.

*To all whom it may concern:*

Be it known that we, JAMES P. PLUMMER and ROY L. PLUMMER, citizens of the United States, residing at Rochester, in the county of Sangamon and State of Illinois, are the first and joint inventors of an Improvement in Animal-Dumps, of which the following is such a full, clear, and exact description as will enable others skilled in the art to which it appertains to make and use our said invention.

Our invention relates to means for dipping swine or other animals into a medicated mixture adapted to prevent or remove vermin and adapted for the treatment of various diseases to which the animals are subject.

The general purpose of the invention is to provide means whereby the animals to be treated may be quickly and effectively plunged into the dip contained in the tank with which the apparatus is used.

More specific purposes of our invention are to provide a tiltable platform, means for normally holding the platform in a horizontal position, means for releasing the platform to quickly dump the animal, means for preventing excessive movement of the platform and means for retaining the animal on the platform.

With these ends in view our invention consists in the novel features of construction and combination of parts shown in the annexed drawings.

Referring to the drawings, Figure 1 is a perspective view of the apparatus in operative relation to the tank with which it is used. Fig. 2 is a top plan of the apparatus and Figs. 3, 4 and 5 are respectively a vertical longitudinal section on the line 3. 3 of Fig. 2; a vertical transverse section on the line 4. 4. of Fig. 2 and an enlarged partial vertical section on the line 5. 5. of Fig. 2.

Similar reference numerals and letters designate like parts in the several views.

The dipping tank 1 is preferably of galvanized sheet iron, and is of suitable dimensions to accommodate the animals to be dipped. The frame on which the platform is mounted, and the platform itself are preferably of wood, but other suitable material may be used. Vertical posts 2 are such a distance apart that the upper part of the tank 1 will lie between the posts as shown in Fig. 1. Side pieces 3, rails 4 and end pieces 5 are firmly secured to the posts 2. The rails 4 rest on the upper edges of the tank 1. The platform 6 is mounted to oscillate on a rod $6^a$ which extends transversely across the platform and is secured on the rails 4. A weight $6^b$ fixed on the under side of the platform gravitates to restore the platform to the horizontal position after it has been tilted. A bar 7 is fixed on the under side of the platform 6 and has inclined parts $7^a$ which, as the platform moves upward, engage with the latch 8. The latch 8 turns on a bolt $8^a$ fixed upon the front rail 4 and has a wedge shaped member $8^b$ which when the bar 7 is in a horizontal position lies under the bar and supports the platform. Diagonal braces 9 connect the rails 4 at the rear end of the frame and prevent downward movement of the rear part of the platform 6. A lever 12 oscillates on a bolt $12^a$ passing through a bracket 10 which is secured to one of the side pieces 3. A horizontal rod 13 connected with the lever 12 and the latch 8 slides in a transverse groove $2^a$ in one of the posts 2 and has a fixed collar $13^a$. A spring 14 surrounds the rod 13 between the post and the collar $13^a$ and normally holds the rod 13 and the latch 8 in the position shown in Fig. 5.

In the practical use of the apparatus, a suitable quantity of the dip having been supplied within the tank 1, the animal is driven onto the platform 6. The operator then moves the upper end of the lever 12 to cause the retraction of the latch 8, whereupon the animal is dumped into the tank, and is immediately withdrawn through the open part of the tank in front of the frame. As soon as the animal is removed from the platform the weight $6^b$ causes the platform to resume a horizontal position and as the front part of the platform moves upward the inclined part $7^a$ of the bar 7 acts on the member $8^b$ of the latch 8 and moves the latch so that the bar passes the latch and the spring 14 immediately acts to replace the member $8^b$ of the latch under the bar 7 and the bar rests upon the member $8^b$ thereby supporting the platform in a horizontal position in readiness for dumping the next succeeding animal.

Having fully described our invention, what we claim as new and desire to secure by Letters Patent is:

1. The combination of a tank, rails supported on said tank, posts secured to said rails, side pieces and end pieces secured to said posts, a platform oscillative between said rails, a lever mounted on one of the side pieces, a latch mounted on one of the rails, a rod connecting the latch with the lever, a spring acting to move the lever and the rod and a bar on the platform engaged by the latch to support the platform in a horizontal position.

2. The combination of a main frame having rails, diagonal braces connecting the rails of said frame, a bolt extending through the rails of the frame, a platform mounted on said bolt, a latch mounted on one of the rails of the frame and a lever mounted on the frame and connected to operate the latch.

In witness whereof we have hereunto subscribed our names at Springfield, Illinois this 19 day of December, 1907.

JAMES P. PLUMMER.
ROY L. PLUMMER.

Witnesses:
H. D. PARKER,
SAMUEL BYERS.